US012689018B2

(12) United States Patent
Heyn et al.

(10) Patent No.: US 12,689,018 B2
(45) Date of Patent: Jul. 21, 2026

(54) PROCESS AND ARRANGEMENT FOR PRODUCTION OF AN ELECTRODE SUSPENSION

(71) Applicant: Coperion GmbH, Stuttgart (DE)

(72) Inventors: Johannes Heyn, Altbach (DE); Markus Fiedler, Wiernsheim (DE); Arno Kwade, Wendeburg (DE); Marcel Weber, Braunschweig (DE)

(73) Assignee: COPERION GMBH, Stuttgart (DE)

( * ) Notice: Subject to any disclaimer, the term of this patent is extended or adjusted under 35 U.S.C. 154(b) by 462 days.

(21) Appl. No.: 18/495,370

(22) Filed: Oct. 26, 2023

(65) Prior Publication Data

US 2024/0145665 A1 May 2, 2024

(30) Foreign Application Priority Data

Oct. 28, 2022 (EP) ..................................... 22204480

(51) Int. Cl.
*H01M 4/04* (2006.01)
*G01N 21/33* (2006.01)
*G01N 21/3563* (2014.01)

(52) U.S. Cl.
CPC .......... *H01M 4/0433* (2013.01); *G01N 21/33* (2013.01); *G01N 21/3563* (2013.01); *G01N 2021/3572* (2013.01)

(58) Field of Classification Search
CPC .... H01M 4/0433; H01M 4/00; H01M 4/0404; H01M 4/04; G01N 21/33; G01N 21/3563; G01N 2021/3572; G01N 21/31; G01N 21/3577; G01N 21/88; B01F 27/72; Y02E 60/10
See application file for complete search history.

(56) References Cited

U.S. PATENT DOCUMENTS

2013/0337319 A1 12/2013 Doherty et al.
2022/0340732 A1* 10/2022 Kobayashi .............. H01G 4/30

OTHER PUBLICATIONS

Defu Cao, Xiaojie Bai, Junhui Wang, Hao Liu and Libing Liao "High Performance Aqueous Li-Ion Flow Capacitor Realized Through Microstructure Design of Suspension Electrode", Frontiers in Chemistry, Jan. 1, 2021, 8 pages.
Bruno Beccard, Shaileshkumar N. Karavadra, and Sudhir Dahal "Lithium-Ion Battery Manufacturing and Quality Control: Raman Spectroscopy, an Analytical Technique of Choice" Spectroscopy, Jun. 1, 2022, 9 pages.
European Search Report for Application No. 22 204 480.2, dated Jul. 27, 2023, 7 pages.

* cited by examiner

*Primary Examiner* — Uzma Alam
*Assistant Examiner* — Gisselle M Gutierrez
(74) *Attorney, Agent, or Firm* — DINSMORE & SHOHL LLP

(57) ABSTRACT

A process and an arrangement for production of an electrode suspension are described. Formulation constituents of the electrode suspension are provided and mixed to give the electrode suspension. At least one optical measurement is conducted on the electrode suspension, in each case by detecting a spectrum of the electrode suspension over at least one subregion of the at least one of ultraviolet, visible and infrared frequency range. The at least one optical measurement is evaluated. The further treatment of the electrode suspension depends on the evaluation.

17 Claims, 10 Drawing Sheets

PROCESS AND ARRANGEMENT FOR PRODUCTION OF AN ELECTRODE SUSPENSION

CROSS-REFERENCES TO RELATED APPLICATIONS

This application claims the priority of European Patent Application, Serial No. EP 22 204 480.2, filed Oct. 28, 2022, the content of which is incorporated herein by reference in its entirety as if fully set forth herein.

FIELD OF THE INVENTION

The present invention relates to a process for producing an electrode suspension. The invention further relates to an arrangement for production of an electrode suspension.

BACKGROUND OF THE INVENTION

Electrode suspensions are used in the production of galvanic energy storage means, for example of batteries and/or accumulators. The electrode suspensions serves here to coat an electrode base material. In this regard, a distinction may be made between anode suspensions and cathode suspensions. Electrode suspensions are also referred to as battery suspensions, battery slurries, electrode pastes or catalyst dispersions.

Processes for producing electrode suspensions are known. Formulation constituents of the electrode suspension are mixed to give a suspension. Different electrode suspensions, especially anode and cathode suspensions, and catalyst dispersions differ in the selection of the respective formulation constituents and the composition thereof. The suspension is currently produced predominantly by the batch method.

Crucial factors for the quality of the electrode suspension are especially the selection of the correct constituents, the properties thereof, for example the particle size of solid constituents, the mixing ratio thereof and/or the dispersion quality. It is therefore a known procedure to verify the electrode suspension before further processing thereof, especially before the electrodes are coated with the electrode suspension.

SUMMARY OF THE INVENTION

It is an object of the present invention to improve a process for producing an electrode suspension, especially to provide a process that ensures the production of the electrode suspension with a target quality and reduces a reject rate.

This object is achieved by a process for producing an electrode suspension, comprising the steps of:

- providing formulation constituents of the electrode suspension,
- mixing the formulation constituents to give the electrode suspension,
- conducting at least one optical measurement on the electrode suspension, in each case by detecting a spectrum of the electrode suspension over at least one subregion of the ultraviolet, visible and/or infrared frequency range,
- evaluating the at least one optical measurement and further treating the electrode suspension depending on the evaluation.

The formulation constituents of the electrode suspension are provided and mixed to give the electrode suspension. At least one optical measurement is conducted on the electrode suspension, in each case by detecting a spectrum of the electrode suspension over at least one subregion of the ultraviolet, visible and/or infrared, especially near infrared, frequency range. The at least one optical measurement is evaluated. The further treatment of the electrode suspension depends on the evaluation.

It has been recognized in accordance with the invention that a reliable characterization of the electrode suspension is possible from the evaluation of the at least one optical measurement. In particular, by means of the at least one optical measurement and the evaluation thereof, the properties of one or more formulation constituents, the mixing ratio of the formulation constituents and/or the dispersion quality are efficiently and reliably verifiable.

The further treatment of the electrode suspension depends on the evaluation of the at least one optical measurement. For example, when variances from target properties are recognized, especially when the quality is lower or higher than a target quality, the electrode suspension can be discharged and/or subjected to treatment, for example by addition of further formulation constituents and/or mixing for a longer period. In the event of sufficient compliance with target properties, especially a target quality, the electrode suspension can especially be sent to further processing steps, for example can be used for coating of electrode base material.

Advantageously, the at least one optical measurement is effected directly on the electrode suspension. There is no need for discharge and/or treatment of samples, for example by dilution and/or centrifugation. This enables particularly time-efficient and effective measurement. The measurement and its significance are not affected by the treatment of a sample.

The performance of at least one optical measurement is particularly advantageous. The analysis of a spectrum has the advantage that relevant properties of the electrode suspension, for example formulation constituents, the mixing ratio thereof and/or the dispersion quality, can be ascertained by a single measurement. This enables efficient verification of the electrode suspension. In particular, verification of the electrode suspension is not limited to individual mechanical or rheological properties.

The optical measurement additionally has the advantage that it barely affects the electrode suspension, especially a suspension stream, if at all. In particular, there is no need for any mechanical and/or rheological measurements, for example by means of a viscometer, that can have adverse effects on a suspension stream. The at least one optical measurement is thus especially suitable for inline applications.

A further advantage of the at least one optical measurement is the ease of scalability thereof.

A further advantage of the at least one optical measurement is the lower proneness to error thereof, especially by comparison with the mechanical and/or rheological measurements. In particular, distortion of the measurement as a result of damage and/or soiling of mechanical measurement devices, for example as a result of soiling and blockage of rotating parts of a viscometer, is avoided.

The measurement can be effected on the finished electrode suspension or in preceding process steps. For example, it is possible to successively add different formulation constituents to the electrode suspension and mix them in. The at least one optical measurement can be effected in different parts of the process, especially on intermediates, for example after individual formulation constituents have been mixed in. The at least one optical measurement preferably follows the providing and mixing of all relevant formulation constituents. It is also possible to conduct optical measurements at different process stages. It is possible in this way to recognize incorrect formulation constituents and/or mixing ratios and/or dispersion qualities and/or separations at an early stage. A reject rate is reduced. Addition of further formulation constituents in low-quality intermediate stages is avoided.

The providing and mixing of the formulation constituents of the electrode suspension is known per se. In particular, suitable formulations for production of electrode suspensions, especially anode and/or cathode suspensions, are known.

Known formulations for electrode suspensions especially include a solvent, at least one conductive additive, at least one electrochemically active material and/or at least one binder. In addition, further additives and/or process auxiliaries may be added.

Suitable solvents are, for example, water, especially distilled, demineralized, deionized and/or fully desalinated water, N-methyl-2-pyrrolidone (NMP) and/or N-ethyl-2-pyrrolidone (NEP), triethyl phosphate (TEP), isopropanol or xylene.

Suitable conductive additives are, for example, carbon black, graphite, graphene, carbon nanotubes (CNTs and/or MWCNTs). The conductive additive is especially in solid form, especially in the form of solid particles. Various conductive additives may especially differ in the particle size of the solid particles.

Electrochemically active materials used may, for example, be graphite, silicon, silicon composites, lithium nickel manganese cobalt oxides, lithium cobalt oxide, lithium manganese oxide spinel, lithium iron phosphate, lithium nickel cobalt aluminium oxide, lithium titanate oxide, lithium-aluminium alloys, lithium-magnesium alloys, lithium-silicon alloys, lithium-tin alloys, sodium iron phosphate and/or lithium hexafluorophosphate. The electrochemically active material is also referred to hereinafter as active material. The proportion of the active material may especially be chosen depending on the type of electrode suspension, especially the anode and/or cathode suspension. Illustrative anode suspensions have a proportion of the active material in the range from 30% by mass to 70% by mass. Illustrative cathode suspensions include active material in the range between 50% by mass and 90% by mass.

Suitable binders are, for example, acrylonitrile-butadiene rubber (NBR), styrene-butadiene rubber (SBR), carboxymethylcelluloses (CMC), polyacrylic acid (PPA), polyvinylidene fluoride (PVDF) and/or polytetrafluoroethylene (PTFE).

The formulation constituents can be mixed, for example, in suitable mixers and/or continuously, especially by means of at least one extruder.

The at least one optical measurement can be effected in transmission arrangement and/or reflection arrangement. The at least one optical measurement is preferably effected in reflection arrangement. In particular, reflectance values of the electrode suspension are detected. For example, a measurement device for performance of the at least one optical measurement may have a spectrometer, especially a spectrophotometer. A measurement device, especially a sensor of the measurement device, can preferably emit light in the frequency range to be analysed, preferably by means of standardized illumination, into the electrode suspension and detect secondary radiation originating therefrom, especially transmitted and/or reflected light, for example reflectance radiation.

The at least one optical measurement detects a spectrum of the electrode suspension. The spectrum may comprise one or more frequencies or frequency bands. The spectrum is preferably a continuous spectrum. The spectrum is detected at least over a subregion of the ultraviolet, visible and/or infrared, especially near infrared, frequency range. Preference is given to detecting at least a subregion of visible light, especially to covering the entire frequency range of visible light. Visible light corresponds in particular to a wavelength range from about 380 nm to about 780 nm. The spectrum detected may additionally or alternatively extend to the infrared range, especially near infrared range, especially to the wavelength range from 780 nm to 3000 nm, and/or UV range, especially to the wavelength range from 100 nm to 380 nm.

The at least one optical measurement is evaluated especially with reference to the particular spectrum detected and/or at least one parameter ascertained therefrom. For example, it is possible to evaluate the at least one optical measurement individually in each case. It is also possible to evaluate multiple optical measurements collectively, for example by comparing the corresponding spectra and/or parameters ascertained therefrom with one another. For example, it is possible to compare two spectra measured at different times and/or positions and/or parameters ascertained therefrom with one another. In particular, it is possible to ascertain a progression of the spectrum and/or of the at least one parameter with time. This enables particularly early recognition of changes in the electrode suspension, especially in the composition thereof. Comparison over time also permits recognition of fluctuations inherent to the process, for example in startup processes and/or an end of the process. The at least one optical measurement may also be evaluated individually in each case, especially by comparing the respective spectrum and/or the respective at least one parameter with target spectra and/or at least one corresponding target parameter.

It is preferably possible to assign properties of the spectrum detected and/or of the at least one parameter to individual formulation constituents and/or process parameters. For example, it is possible to assign one or more peaks in the spectrum to a particular formulation constituent. A change in the height of the peak and/or an area beneath the peak can be assigned to a change with regard to the respective constituent, for example an increase or decrease in the proportion of the formulation constituent in the electrode suspension. Additionally or alternatively, it is possible to ascertain a total area beneath the spectrum. In this way, it is especially possible to ascertain a total intensity of the light detected, especially of the light reflected and/or transmitted, in the frequency range used for the optical measurement. This permits, for example, conclusions of the optical density of the material and hence of the density and/or the size of solid particles, especially of soot and/or graphite particles.

More preferably, the evaluation is effected using at least one parameter ascertained from the spectrum. Evaluation using colour values has been found to be particularly suitable. With the aid of the at least one optical measurement, it is especially possible to determine a colour of the electrode suspension. For example, it is possible by means of the at least one optical measurement to detect a spectrum over the visible frequency range, and to evaluate it, in particular for determination of colour values. The inventors have recognized that it is reliably possible to verify target properties of the electrode suspension using the colour. Colour variances, especially variances in individual colour coordinates, can preferably be assigned to individual formulation constituents and/or process parameters. Evaluation using colour values is particularly intuitive and efficient.

With the aid of the evaluation of the at least one optical measurement, compliance with target parameters in the production of the electrode suspension, especially quality of the electrode suspension, can be verified efficiently and simply. The evaluation permits quality control independently of any other preliminary tests. In this way, it is possible in particular to assess the electrode suspension by one or more quality criteria. The electrode suspension can preferably be classified into different quality levels using the evaluation. In particular, it is possible to verify whether the electrode suspension meets a target quality. If the quality is found to be lower or higher than the target quality, the electrode suspension can be simply and efficiently discharged. With the aid of the at least one optical measurement, it is possible to detect production errors at an early stage. This reduces the reject rate overall. The production process is time-, material- and/or energy-efficient.

A process in which the evaluation is effected using at least one colour coordinate of a colour space that has been ascertained from the spectrum, especially using a colour locus ascertained from the spectrum, enables particularly intuitive and reliable evaluation of the at least one optical measurement. A colour space is the totality of all colours that can be represented in a colour model. Depending on the underlying colour model, the colour space has a particular dimensionality, generally three or four dimensions. The colour locus is a point in the colour space to which a particular colour is assigned. The colour locus is defined by colour coordinates corresponding to the dimensions of the colour space. The colour locus and the corresponding colour coordinates are therefore parameters that can be ascertained from the spectrum detected in the at least one optical measurement, especially from a spectrum detected over the entire frequency range of the optical light. On the basis of the at least one optical measurement, for example, a colour evaluation is possible for determination of at least one colour coordinate, especially the colour coordinates of the colour locus, in a suitable colour space. The at least one optical measurement may preferably be a colour measurement. The at least one colour coordinate, especially the colour locus, can especially be determined by spectrophotometry, for example with the aid of a spectrophotometer.

It has been recognized in accordance with the invention that it is possible to represent significant information in the colour spectrum in the low-dimensional representation of at least one colour coordinate, especially of the colour locus. An evaluation using the at least one colour coordinate, especially the colour locus, can draw meaningful conclusions as to properties of the electrode suspension, especially the formulation constituents thereof and/or the mixing ratio and/or the dispersion quality. For example, different formulations, especially different formulation constituents and/or mixing ratios, can be distinguished by virtue of their respective influence on the colour of the electrode suspension using the at least one colour coordinate. In particular, the inventors have recognized that individual formulation constituents and/or process parameters have different effects on different colour coordinates, and so the results of the evaluation can be assigned to the respective formulation constituents and/or process parameters. This enables simple, intuitive and efficient evaluation. The evaluation can be effected visually, for example, by comparing the colour locus with a target colour locus.

The evaluation using the colour locus may especially be an evaluation using the corresponding colour coordinates, especially a single one of these colour coordinates. For example, the evaluation can be effected by comparing the at least one colour coordinate with a target colour coordinate and/or the colour locus with a target colour locus.

The choice of the specific colour model and hence of the colour space is immaterial for the evaluation. In principle, it is possible to use all suitable colour spaces, for example RGB, CMY, CMYK, HSV, HSL, HSB, HSI and/or Lab colour spaces. The L*a*b* colour space, also called CIELAB colour space, has been found to be particularly suitable. The CIELAB colour space is standardized in EN ISO 11664-4. The CIELAB colour space is a three-dimensional colour space in which each colour is defined by a colour locus with Cartesian coordinates L*, a* and b*. The a*b* coordinate plane is based on the complementary colour theory, with green and red opposite one another on the a*axis, and blue and yellow opposite one another on the b*axis. The L*coordinate describes the brightness.

An evaluation of a colour measurement is elucidated by way of example hereinafter. For example, it is possible to conduct multiple measurements successively and/or at different positions. Particularly changes over time in one or more colour coordinates indicate a non-steady-state process, for example owing to a startup of the mixing device, owing to metering fluctuations, owing to metering failures, owing to bridge formation in the supply of raw material, owing to added degassing operations and/or owing to changes in speed. Values constant in time and/or space for the at least one colour coordinate indicate steady-state processes, for example after conclusion of the startup and/or after homogeneous incorporation of the formulation constituents into the electrode suspension. Fluctuations, especially fluctuations in space, in the at least one colour coordinate allow conclusions as to the dispersion quality.

The effects of individual formulation constituents on the evaluation of the colour measurement are described hereinafter using the example of the CIELAB colour space. The b* colour coordinate especially permits conclusions as to the type, amount and/or incorporation of the binder components in the electrode suspension. For example, changes in the b* colour coordinate can indicate a change in the binder content, for example on account of metering fluctuations. The a* colour coordinate especially permits conclusions as to the type, amount and/or incorporation of active material, especially silicon, in the electrode suspension. For example, changes in the a* colour coordinate can indicate a change in the proportion of the active material, especially in the silicon content, for example on account of metering fluctuations. The L* colour coordinate can especially be used to draw conclusions as to the proportion and/or the particle size of the conductive additive, especially soot and/or graphite. For example, a decrease in the L* value indicates a rise in the proportion of the conductive additive. For the same proportion of the conductive additive, a change in the L* values can indicate a change in the particle size, especially toward smaller particle sizes.

The above examples are intended to elucidate the option of evaluation of the at least one optical measurement using at least one colour coordinate and the conclusions derivable therefrom. The above examples should not be understood in a restrictive manner. A corresponding evaluation can also be effected using at least one colour coordinate of a different colour space. In particular, correlations of the respective colour coordinates with formulation constituents and/or process parameters may also be defined for other colour spaces. For example, it is possible in the case of a calibration of the measurement to determine the change in the at least one colour coordinate depending on known changes in formulation and/or process.

A process in which at least one colour variance of the at least one colour coordinate from a corresponding target colour coordinate is ascertained and further treatment of the electrode suspension is effected depending on the at least one colour variance, is particularly precise and efficient. The colour variance enables, in a simple and exact manner, quantification of the properties to be verified in the electrode suspension. The colour variance may especially be ascertained for each colour coordinate. It is also possible to determine the colour variance for the colour locus overall. For example, it is possible to determine a colour difference, for example a ΔE colour difference. The ΔE colour difference is standardized, for example, according to DIN EN ISO 11664-6. With the aid of the colour variance, it is possible to quantify a variance from the target colour coordinate, especially from the target colour locus. This enables quantification of the variance of the respective properties from target properties, especially from a target quality.

It is possible with preference to define one or more limits for the colour variance, especially for the colour variance per colour coordinate. By comparing the colour variance with the at least one limit, categorization of the electrode suspension is possible. For example, it is possible to define a limit that enables a distinction between different quality levels. Below the limit, the target quality is considered to be fulfilled. If the colour variance exceeds the limit, the electrode suspension can be assessed as being of low quality and discharged.

It is possible with preference to define multiple limits in order to distinguish between different quality levels. For example, it is possible to define two limits, especially two limits per colour coordinate. A first limit may distinguish between a first quality level (quality Q1) and a second quality level (quality Q2). The second limit may bound a third quality level (quality Q3) from the second quality level. While electrode suspensions of quality Q1 can be processed further directly, an electrode suspension of quality Q2 can be sent to a reprocessing operation in which the quality is improved by further processing steps. An electrode suspension of quality Q3 can be considered as reject material and discharged. The electrode suspension discharged can be removed completely from the process and/or, especially in diluted form, fed to the process as starting material.

Target values and/or limits may preferably be defined in a formulation- and/or process-dependent manner. For example, the target values and/or limits may be determined by available data and/or calibration measurements for the respective formulation and/or the respective process. In particular, data from earlier production batches and/or data from calibration measurements can be used to derive statistical values in order to determine target values and/or limits. For example, an average can be used as target value and/or a distribution spread, for example 3 or 6 sigma, as tolerance range, especially as limit. For example, a first limit, especially between quality Q1 and Q2, may be chosen at 3 sigma and a second limit, especially between quality Q2 and Q3, at 6 sigma.

A process in which the electrode suspension is produced continuously, especially by means of an extruder, is particularly efficient and economical. The continuous production of the electrode suspension overcomes the disadvantages of standard batch methods, especially small batch volumes, elevated quality fluctuations between individual batches, and the large amount of space required in the case of multiple batch lines. The at least one optical measurement is particularly suitable for the continuous production of the electrode suspension, especially since measurement is effected directly on the electrode suspension and not on branched-off and/or processed samples. Moreover, the at least one optical measurement and the evaluation thereof are readily scalable depending on the production process. This enables reliable, especially essentially continuous, verification of the continuous production process.

The continuous production of the electrode suspension is especially possible with at least one extruder. In principle, it is possible to use any extruders for the continuous production of the electrode suspension. The type, the configuration and/or the method of operation of the extruder may especially be chosen depending on the electrode suspension to be produced. For example, it is possible to use co-rotating, counter-rotating, tight-meshing, non-tight-meshing and/or conical extruders. The extruder may have one, two or more shafts. The extruder is preferably designed as a multi-shaft extruder, especially designed as a co-rotating twin-shaft extruder. The continuous production can preferably be conducted with the aid of a co-rotating, tight-meshing twin-shaft extruder or twin-screw extruder. It is also possible to use co-kneaders. The at least one extruder may be of modular construction and enable the addition of the individual formulation constituents in solid or liquid form at multiple points along the process part of the extruder. The at least one extruder may also enable degassing of air and/or low molecular constituents, especially atmospheric and/or vacuum-assisted degassing. The production process in the at least one extruder may also be blanketed with process gases, especially with inert gases, in order to prevent oxidation of the electrode suspension and/or to meet ATEX demands.

The extruder may, for example, have a screw diameter SD in the range from 10 mm to 250 mm, especially from 12 mm to 133 mm. A ratio of screw length SL to screw diameter SD (also referred to as the L/D ratio) of the extruder may, for example, be in the range from 25 to 70, especially in the range from 40 to 52.

A process in which, depending on the evaluation, a multiway switch for deflection of the suspension stream, especially at an extruder outlet, is actuated, is particularly efficient and economical. In particular, it is possible to divert the suspension stream depending on a quality criterion, especially on the attainment of a target quality. For example, it is possible to actuate a two-way switch in order, if required, to be able to discharge electrode suspension that does not meet the quality demands. An electrode suspension that meets the quality demands can especially be passed onward directly via the multi-way switch to further processing stations and/or a buffer silo. It is also possible to actuate a three- or multi-way switch. In particular, the suspension stream may be diverted depending on a respective quality level.

The process in which the at least one optical measurement is effected inline, especially in the region of an extruder outlet, is particularly economical and enables a low reject rate. The inline measurement can be conducted directly in the course of the production process. Inconvenient sampling and/or sample processing is avoided. This enables short reaction times. The measurement is preferably effected in the region of a mixing device, for example in a mixer. The electrode suspension can preferably be verified during the mixing operation. In continuous processes, the at least one optical measurement can especially be effected in the region of an extruder outlet. The optical measurement can be effected upstream and/or downstream of the extruder outlet, especially sufficiently close to the extruder outlet that the formulation constituents have already been mixed to give the electrode suspension. For example, the at least one optical measurement can be effected upstream of a multiway switch to be actuated. In this case, when variances from a target property are measured, especially a target quality, the multiway switch may be actuated without having to take account of flow times of the suspension to the switch. In this way, it is possible to react rapidly and efficiently to variances from target properties, for example to fluctuations in quality.

A process in which multiple optical measurements are conducted at different positions, enables particularly precise and reliable verification of the electrode suspension to be produced. Multiple optical measurements at different positions are particularly advantageous for continuous production processes. This advantageously enables target properties to be followed along a conveying zone. For example, it is possible to detect separation processes in the suspension stream, for example in a pipeline and/or a buffer silo. Multiple optical measurements at different positions in a continuous production process additionally have the advantage that it is possible to monitor the suspension stream conveyed through the production plant over time. For example, optical measurements in the region of an extruder, especially in the region of the process section and/or the extruder output, are possible in the region of a pipeline and/or in, upstream of and/or downstream of a buffer silo. In this way, it is possible to follow separation processes after mixing, especially in pipelines and/or in the buffer silo. Multiple measurements can also be effected at different depths in the electrode suspension or the suspension stream. For example, multiple measurement devices with sensors immersed to different depths in the suspension stream may be provided, for example in the region of an extruder output, of a buffer silo and/or of pipelines.

It is also possible to measure at different positions within a mixing device. For example, it is possible to measure at different positions within the extruder, in order to follow a dispersion quality along the process section and/or the extruder output. The measurement at different positions is also advantageous for batchwise methods. For example, it is possible to measure at different positions within a mixing device. By comparing the measurements at different positions, it is possible to ascertain and/or compare a dispersion quality at different points. For example, it is possible to verify the homogeneity of the electrode suspension. In this way, in particular, the conclusion of a mixing operation in the batchwise process may be determinable.

A process in which multiple optical measurements are conducted successively, especially in that the optical measurements are repeated regularly, preferably conducted essentially continuously, is particularly precise and reliable. The multiple optical measurements conducted successively may be evaluated individually or collectively. For example, it is possible to compare multiple optical measurements conducted successively with one another. In particular, the spectra measured successively and/or respectively ascertained parameters, especially at least one colour coordinate, can be compared with one another. In this way, effects over time, especially separation processes and/or startup or shutdown of the production plant, are ascertainable. It is also possible to individually evaluate each of the optical measurements conducted successively. For example, the respectively ascertained spectra and/or the parameters ascertained therefrom, especially at least one colour coordinate, can be compared with corresponding target parameters, especially target colour coordinates. In this way, compliance with target properties, especially a target quality, can be ascertained at different times. In addition, a progression of the verified properties over time can be ascertained and documented.

The repeated performance of the optical measurement has in particular the advantage of short reaction times. The optical measurement is preferably repeated regularly, preferably conducted essentially continuously. In this way, it is possible to react quickly and efficiently to variances from target properties, especially a target quality. This has been found to be particularly advantageous for continuous production processes. The essentially continuous measurement makes it possible in particular to reduce a reject rate.

The repeated optical measurement, especially the essentially continuous performance of the optical measurement, can especially be effected in at least one time interval of the production process. For example, the repeated measurement can be effected during a startup of the plant, especially of a mixing device, for example an extruder. In this way, it is possible to monitor startup processes and precisely determine startup times. In particular, it is possible to determine the juncture from which the electrode suspension satisfies at least one respective target property. Preference is given to repeated measurement, especially essentially continuous measurement, over the entire process duration. Variations over time in the properties, especially the quality, of the electrode suspension can be detected and followed. In this way, it is especially possible to detect metering failures, changes in metering, batch fluctuations, especially in combination with replenishment limits and/or metering control, and/or fluctuations in other process parameters, for example in a throughput, a process temperature and/or a speed.

Especially in a batchwise process, it is possible to use repeated performance of optical measurements, especially essentially continuous optical measurement, advantageously for verification of the individual process steps. For example, changing parameters, especially changing colour coordinates, can indicate that the respective process step, for example mixing of two or more formulation constituents, is still incomplete. Parameters that are constant over time, especially colour coordinates, can indicate conclusion of the respective process step.

A process in which, depending on the evaluation, especially depending on at least one colour coordinate, the providing of the formulation constituents and/or the mixing of the formulation constituents, especially the process parameters of an extruder, is/are controlled by closed-loop control, is particularly efficient and economical. The closed-loop control can bring about a stable process with a particularly low reject rate. Recognized variances from a target property, especially a target quality, can be counteracted particularly effectively and efficiently. The reaction times are low.

The closed-loop control of the providing of the formulation constituents may especially comprise the closed-loop control of the metering of the formulation constituents. For example, metered addition of different formulation constituents may be varied on the basis of the evaluation. Additionally or alternatively, further process parameters, especially a mixing time and/or a speed of a stirrer system, may be controlled by closed-loop control. In the case of a continuous process, it is especially possible to control process parameters of an extruder by closed-loop control, for example speed, temperature, especially housing and/or suspension temperature, and/or extruder throughput.

The closed-loop control is preferably effected automatically, especially fully automatically. For example, it is possible to use machine learning methods, especially neural networks, to undertake corresponding closed-loop control measures depending on the evaluation of the at least one optical measurement. The closed-loop control is preferably effected depending on the evaluation of at least one colour coordinate, especially a colour locus. The evaluation of at least one colour coordinate has the advantage—especially over the evaluation of a spectrum—of low dimensionality. The smaller parameter space when a colour space is used enables efficient and targeted use of automated closed-loop control mechanisms, especially based on machine learning. Training of AI algorithms based on colour coordinates of a colour space and/or further process parameters is efficiently possible. For example, it is possible to generate training data by measuring at least one parameter, especially at least one colour coordinate, while varying formulation constituents, the mixing ratio thereof and/or the mixing operation, especially process parameters of the extruder.

A process in which a result of the evaluation, especially at least one colour coordinate, is stored, is particularly precise and efficient. The storing of the evaluation results enables trackability and monitorability of the properties, especially quality, of the electrode suspension. In particular, it is possible to track any problems subsequently as well. The evaluation results are preferably stored continuously.

Further process parameters are preferably stored as well. For example, it is possible to store the type and/or dosage of the formulation constituents provided. In addition, it is possible to store process parameters from the mixing operation, especially in an extruder. In this way, it is possible to use changes in the process parameters to draw conclusions as to the altered measurement results, especially the at least one colour coordinate. The change in the measurement results can be evaluated depending on the changes in the process parameters, especially taking account of dwell times and/or conveying times. Findings obtained therefrom can be used for further optimization of the production process, especially for further optimization of closed-loop control of the production process. In particular, closed-loop control of the production process is possible on the basis of the previously stored evaluation results and/or process parameters, especially a comparison therewith. The stored results of the evaluation and/or further process parameters may especially be used as training data for training machine learning methods for closed-loop control of the production process.

It is a further object of the present invention to improve an arrangement for production of an electrode suspension.

This object is achieved by an arrangement for production of an electrode suspension, having a mixing device for mixing two or more formulation components to give the electrode suspension, at least one measurement device for conducting at least one optical measurement on the electrode suspension, where the at least one measurement device is designed to detect a continuous spectrum of the electrode suspension over at least one subregion of the ultraviolet, visible and/or infrared frequency range, and an evaluation unit for evaluation of the at least one optical measurement.

The arrangement has a mixing device for mixing of multiple formulation components to give an electrode suspension, at least one measurement device for performance of at least one optical measurement on the electrode suspension, and an evaluation unit for evaluation of the at least one optical measurement. The at least one measurement device is designed to detect a continuous spectrum of the electrode suspension over at least a subregion of the ultraviolet, visible and/or infrared, especially near infrared, frequency region. The arrangement, especially the evaluation unit, is especially designed to perform the above-described process. The arrangement has the advantages described in relation to the process. The arrangement and the constituents thereof may have individual or a plurality of the advantageous features described above in relation to the process.

The at least one measurement device especially has a spectrometer, preferably a spectrophotometer. This enables the ascertaining of at least one colour coordinate, especially a colour locus, from the spectrum. The evaluation unit is especially designed to conduct the evaluation on the basis of the at least one colour coordinate, especially the colour locus.

The at least one measurement device may have a sensor, for example in the form of a measurement probe. The measurement device is preferably arranged in such a way that the electrode suspension flows at least partly around it, and especially around a sensor of the measurement device. The spectrum of the electrode suspension is preferably detected directly, especially in an undistorted manner. This enables particularly exact measurement, especially colour measurement.

The arrangement may include at least one metering device for metered addition of at least one formulation constituent. The arrangement preferably has two or more metering devices for different formulation constituents. The metering device may especially be a gravimetric and/or volumetric metering device.

An arrangement in which the mixing device has an extruder, enables particularly economical production of the electrode suspension. The mixing device may especially be an extruder or comprise an extruder. Extruders are particularly suitable for continuous production of the electrode suspension. In particular, the electrode suspension may be conveyed from the extruder directly to further processing stations for further treatment of the electrode suspension, for example through appropriate pipelines. It is also possible to dispose one or more buffer silos between extruder and downstream processing stations. The electrode suspension may be intermediately stored and/or processed in the buffer silos.

The extruder is especially a multi-shaft extruder, preferably a co-rotating multi-shaft extruder. The multi-shaft extruder is especially designed as a twin-shaft extruder or as a twin-screw extruder.

A multi-way switch for deflection of the suspension stream, especially at an extruder outlet, depending on the evaluation of the at least one optical measurement, enables particularly economical production of the electrode suspension. In particular, the reject rate is reduced. For example, with the aid of the multi-way switch, it is possible to discharge only that electrode suspension for which a variance from target properties, especially a target quality, has been detected.

An arrangement in which the at least one measurement device is set up to analyse the electrode suspension in the mixing device and/or at an outlet from the mixing device, especially at an extruder outlet, is particularly economical. In particular, the measurement can be effected inline. There is no need for sampling and/or sample processing. With the aid of the at least one measurement device, it is especially also possible to verify the dispersion quality, especially the homogeneity of the electrode suspension, during and/or after the mixing operation.

An arrangement comprising multiple measurement devices disposed at different positions, enables particularly exact verification of the electrode suspension. The measurement device disposed in different positions allows detection of local effects, for example mixing processes in a pipeline or in a buffer silo. It is also possible for multiple measurement devices to be disposed in different positions in the mixing device, especially in a mixing device to be operated in the batchwise process. This makes it possible to verify homogeneity of the suspension properties, especially the dispersion quality.

An arrangement comprising a control unit for open-loop and/or closed-loop control of the mixing device and/or further treatment of the electrode suspension depending on the evaluation of the at least one optical measurement, is particularly efficient and economical. With the aid of the control unit, it is possible to react with a short reaction time to recognized variances of target properties of the electrode suspension.

The control unit may especially have a one-part design together with the evaluation unit and/or comprise the evaluation unit. The control unit may also have a multipart design, especially comprising various control modules. For example, the control unit may have an extruder controller for actuation of an extruder.

The arrangement preferably has a closed-loop control unit for controlling the production process depending on the evaluation of the at least one optical measurement and/or further process parameters. The closed-loop control unit can give control commands for closed-loop control of the plant, especially the mixing device, for example, on the basis of measurement results and/or further process parameters. The closed-loop control unit may preferably also incorporate previously stored measurement results and/or process data into the closed-loop control process. The closed-loop control unit may be integrated, for example, into a control unit, especially into an extruder controller. It is also possible that the closed-loop control unit transfers control commands to a control unit for actuation of the plant, especially the mixing device.

An arrangement in which the at least one measurement device includes a spectrophotometer, is particularly advantageous. In particular, a measurement device including a spectrophotometer is suitable for determination of a colour of the electrode suspension. In this way, evaluation based on at least one colour coordinate, especially a colour locus, is possible in a simpler manner.

Further features, advantages and details of the invention will be apparent from the working examples that follow and the accompanying figures.

DESCRIPTION OF THE PREFERRED EMBODIMENT

Figure 1:
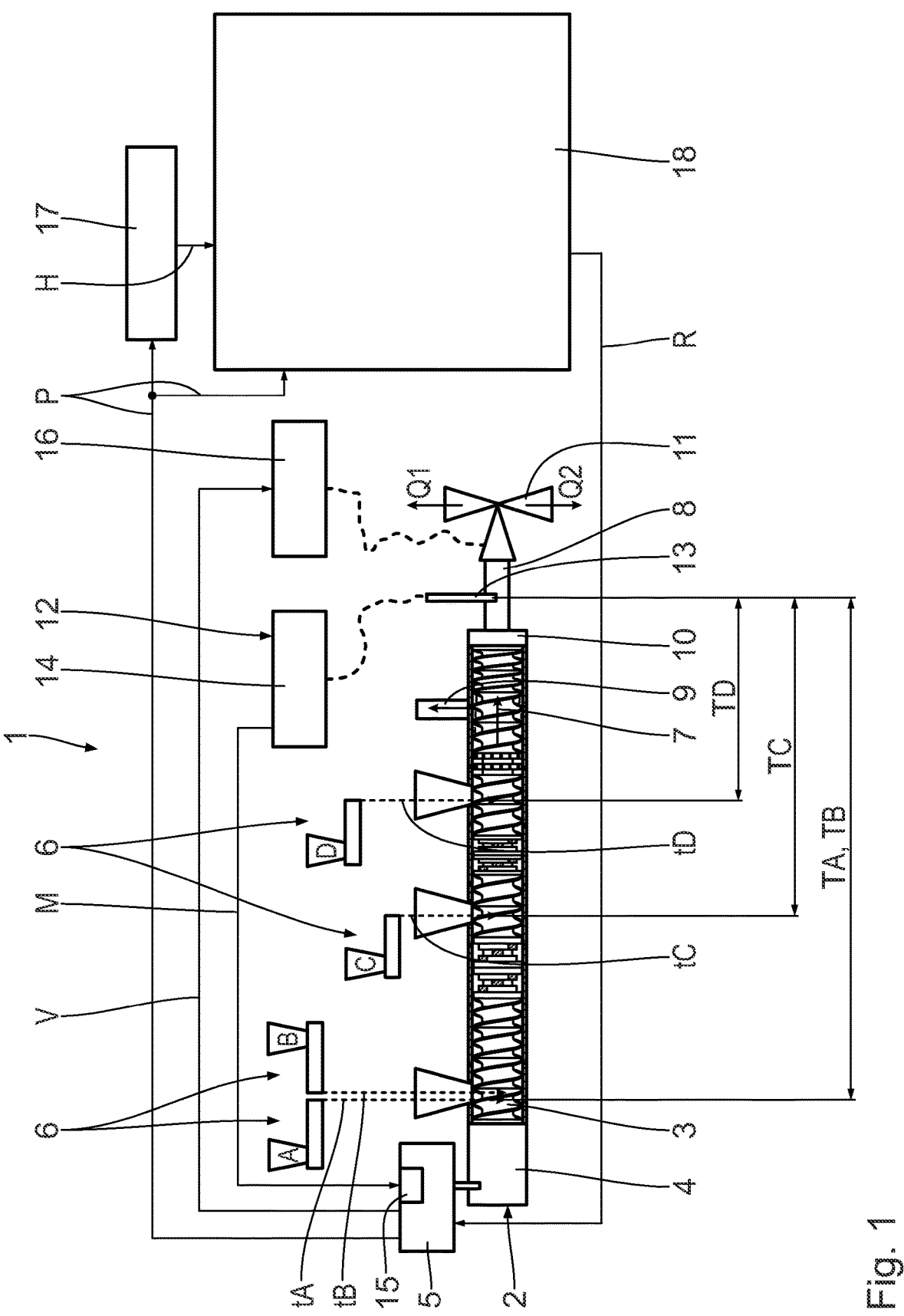
FIG. 1 shows a schematic diagram of an arrangement for production of an electrode suspension with a measurement device for performance of at least one optical measurement on the electrode suspension.

FIG. 1 shows a first working example of an arrangement 1 for production of an electrode suspension. The arrangement 1 has a mixing device in the form of an extruder 2. The extruder 2 is designed as a multi-shaft extruder or twin-shaft extruder. The extruder 2 has two extruder screws 3 that are co-rotating, i.e. are rotationally driven in the same directions of rotation. The extruder 2 is, for example, a co-rotating, tight-meshing twin-screw extruder. The configuration of the extruder screws 3 shown in FIG. 1 is merely illustrative. For the production of suitable electrode suspensions, the person skilled in the art is able to choose suitable extruder configurations and extruder screw configurations. The extruder screws 3 are driven by means of an extruder drive 4. The extruder drive 4 especially has a motor, a coupling and a transmission. The extruder drive 4 is actuatable via an extruder controller 5. The extruder controller 5 controls the process parameters of the extruder under open-loop and/or closed-loop control, especially the speed, the throughput and/or the temperature, especially the housing temperature.

The arrangement 1 has metering devices 6 for metered addition of formulation constituents A, B, C, D. The metering devices 6 are disposed along the extruder screw 3. Different formulation constituents A, B, C, D are introduced into the extruder 2 at different points. The formulation constituents A, B, C, D may correspond to individual constituents of the electrode suspension, for example the solvent, the active substance, the conductive additive and/or the binder. At least individual formulation constituents A, B, C, D of those shown in FIG. 1 may also already be mixtures of individual or multiple constituents among these. The metering devices 6 may, for example, be gravimetric and/or volumetric metering devices. For the various formulation constituents A, B, C, D, it is also possible to provide different metering devices 6, especially depending on the state of matter (solid, liquid, gaseous) of the respective formulation constituent A, B, C, D. The extruder controller 5 is preferably also designed for actuation of the metering devices 6.

The formulation constituents A, B, C, D are provided with the aid of the metering devices 6 and mixed with the aid of the extruder 2 to give the electrode suspension. The formulation constituents A, B, C, D and the resulting electrode suspension are conveyed in conveying direction 7 by rotation of the extruder screws 3. An end plate 10 and an extruder outlet 8 are disposed at the end in conveying direction 7. The electrode suspension is conveyed through the extruder outlet 8.

The extruder 2 has a degassing unit 9. The degassing unit 9 is designed, for example, for atmospheric degassing or for vacuum degassing. By means of the degassing unit 9, it is possible to degas air and/or low molecular weight constituents of the electrode suspension.

A multiway valve 11 disposed at the extruder outlet 8 can be used to divert a suspension stream of the electrode suspension. In the working example shown in FIG. 1, the multiway valve 11 is a three-way valve. The electrode suspension may be directed to different outlets from the multiway valve 11 depending on a quality of the electrode suspension. This is shown schematically by the arrows Q1 or Q2 in FIG. 1. When the quality is below a target quality, the electrode suspension can be discharged, for example, especially channeled into a collecting vessel. On attainment of the target quality, the electrode suspension can be conducted onward, for example into a buffer silo and/or directly to further processing stations for further treatment of the electrode suspension.

In order to verify the quality of the electrode suspension, the arrangement 1 has a measurement device 12. The measurement device 12 has a sensor 13. The sensor 13 is configured as a measurement probe and is disposed in the region of the extruder outlet 8.

The sensor 13 is disposed in the region of the extruder outlet 8 in such a way that the electrode suspension at least flows around the end of it. The sensor 13 serves to inject light into the electrode suspension and to receive the reflectance radiation emanating from the electrode suspension.

The sensor 13 is in signal connection with a measurement unit 14 of the measurement device. The measurement unit 14 has a spectrophotometer. With the aid of the spectrophotometer, a spectrum of the electrode suspension is detected from the detected reflectance radiation. The spectrum detected covers at least a subregion of ultraviolet, visible and infrared, especially near infrared, light, especially the complete frequency range of visible light. The spectrophotometer uses the spectrum detected to determine a colour of the electrode suspension. For this purpose, the spectrophotometer determines the corresponding colour locus and the relevant colour coordinates in a suitable colour space. The choice of the colour space is immaterial. The CIELAB colour space has been found to be particularly suitable. This has the colour coordinates L*, a*, b*. The colour coordinates are measurement data M. In other working examples, the measurement data may additionally or alternatively also include the spectrum detected and/or other parameters obtained therefrom. It is possible to draw conclusions from the measurement data M, especially from the colour coordinates, as to individual process parameters and/or formulation constituents and/or the mixing ratio thereof and/or the dispersion quality.

The measurement device 12 is designed for continuous verification of the electrode suspension. This enables early recognition of possible variances of the electrode suspension from target properties, especially from a target quality.

The measurement data M ascertained by means of the measurement device 12 are transmitted to an evaluation unit 15. In the working example shown, the evaluation unit is integrated into the extruder controller 5. In other working examples, the measurement device itself serves, for example, as an evaluation unit. In that case, no separate evaluation unit is required. It is also possible to conduct various steps of the evaluation in different devices.

Because of the different positioning of the metering devices 6 along the extruder 2, each of the formulation constituents A, B, C, D metered in have different dwell times in the process before they pass the sensor 13 of the measurement device 12. These are firstly the metering times ti, where i=A, B, C, D, for introduction of the respective formulation constituents A, B, C, D into the extruder. There is additionally the respective conveying time Ti, where i=A, B, C, D, in the extruder. The metering times ti and the conveying times Ti are shown schematically in FIG. 1. The total dwell time of the formulation constituents A, B, C, D adds up to ti+Ti. A change in the metered addition and/or failure of the metered addition of one of the formulation constituents A, B, C, D can be detected with the aid of the measurement device 12 after the respective dwell time ti+Ti.

With the aid of the measurement device 12, the electrode suspension is verified in the region of the extruder outlet. In other working examples, verification can also be effected at other positions, for example in the region of the end plate. It is also possible to use multiple measurement devices 12 and/or multiple sensors 13 at different positions.

With the aid of the evaluation of the measurement data M, it is possible to determine the quality of the electrode suspension. In particular, a quality of the electrode suspension is quantifiable. For example, the electrode suspension can be classified into different quality classes depending on the evaluation of the measurement data, especially as to whether a target quality has been met (on-spec products) or not (off-spec products).

Control data V are transmitted from the extruder controller 5 to a valve controller 16 of the multiway valve 11. In other working examples, the valve controller may also be integrated into the extruder controller. For example, the extruder controller 5 can directly actuate the multiway valve 11. Depending on the evaluation, especially on an ascertained quality level, the multiway valve 11 is actuated for automatic deflection of the suspension stream. As a result, if the quality is below a target quality, the electrode suspension can be discharged in order to avoid unnecessary rejection.

The measurement data M, a result of the evaluation and/or other process parameters are transmitted as process data P to a data storage medium 17, where they are stored. As a result, the process data P, especially any changes in quality, are trackable and monitorable. Quality problems may be tracked using the stored process data P. The storage may be essentially continuous, like the performance of the optical measurement. It is possible to undertake the storage at freely adjustable, fixed time intervals and/or in the event of changes, in order to assure sufficient tracking, for example once per second, once per minute, once per hour or once per day. The storage intervals may be preset for different datasets. The storage may additionally or alternatively be triggered manually, for example when production problems are recognized. Possible storage intervals may, for example, be between 1 sec. and one day, especially 1 sec., 30 sec., 1 min, 5 min., 1 h and/or 1 day.

The data storage medium 17 may, for example, be part of a server. It is also possible to use a cloud as data storage medium 17. The data storage medium may especially be part of an ERP system (ERP: Enterprise Resource Planning), MES system (MES: Manufacturing Execution System) and/or SCADA system (SCADA: Supervisory Control and Data Acquisition).

The process data P are additionally sent to a closed-loop control unit 18. Additionally or alternatively, the closed-loop control unit 18 may also receive historic process data H stored in the data storage medium 17. The closed-loop control unit 18 determines closed-loop control parameters R based on the process data P and/or the historic process data H. Depending on the process data P and/or the historic process data H, closed-loop control commands R are then transmitted to the extruder controller 5 for corresponding actuation of the extruder 2 and/or the metering devices 6. The closed-loop control unit 18 enables closed-loop control of the provision of the formulation constituents A, B, C, D and/or the mixing operation in the extruder on the basis of the process parameters P ascertained, especially the result of the evaluation of the measurement data M included therein and/or of the measurement data M themselves.

The closed-loop control unit 18 is shown outside the extruder controller 15 in the working example shown schematically in FIG. 1. For example, the closed-loop control unit 18 may be part of a server and/or cloud system. In other working examples that are not shown, the closed-loop control unit may be part of the extruder controller and/or the evaluation unit.

The closed-loop control unit 18 may especially execute closed-loop control algorithms, preferably based on machine learning, especially neural networks, in order to determine the closed-loop control commands R based on the process parameters P and/or the historical process parameters H. In such a case, the historical process parameters H can be used to train the machine learning algorithms. This makes it possible to further optimize the closed-loop control system implemented with the aid of the closed-loop control unit 18.

In other working examples that are not shown in the figures, there is no closed-loop control of the production process on the basis of the process data P, in particular of the measurement data M. If variances, for example from a target quality, are detected, this can be displayed to a user of the system, for example on a control panel of the measurement device 12, on a control panel of the extruder controller 5 and/or on a control panel in a control room. Depending on the variance detected, it is then possible to take corresponding countermeasures.

There follows a detailed description of the optical measurement and the evaluation thereof. For evaluation of the measurement data M, these may be compared, for example, with measurement data M ascertained beforehand. In this way, it is possible in a simple manner to ascertain fluctuations with time in the suspension properties determinable by means of the measurement. Fluctuations may result, for example, from unstable processes as can occur, for example, in the startup of the extruder 2 of the arrangement 1. Additionally or alternatively, it is possible to compare the measurement data M with defined corresponding target parameters, especially target colour loci and/or target colour coordinates. In particular, it is possible to determine a variance, especially colour variance, from corresponding target parameters, especially target colour coordinates. Using the variance ascertained, the property of the electrode suspension to be determined is quantifiable. In particular, a quality of the electrode suspension is quantifiable. For example, the electrode suspension can be classified into different quality classes depending on the evaluation of the measurement data, especially as to whether a target quality is met (on-spec products) or not (off-spec products).

The evaluation with reference to ascertained colour coordinates is described by way of example with reference to FIGS. 2 to 5. The inventors have recognized that, with reference to a colour locus, especially the colour coordinates, it is possible to draw reliable conclusions as to the respective formulation constituents, the mixing ratio thereof, the dispersion quality, further process parameters and/or changes therein. In particular, it has been found that different formulations are notable for different colour loci, especially different colour coordinates. With reference to the colour coordinates, it is therefore possible to recognize, especially determine, different formulations, especially different proportions of respective formulation constituents.

Figure 2:
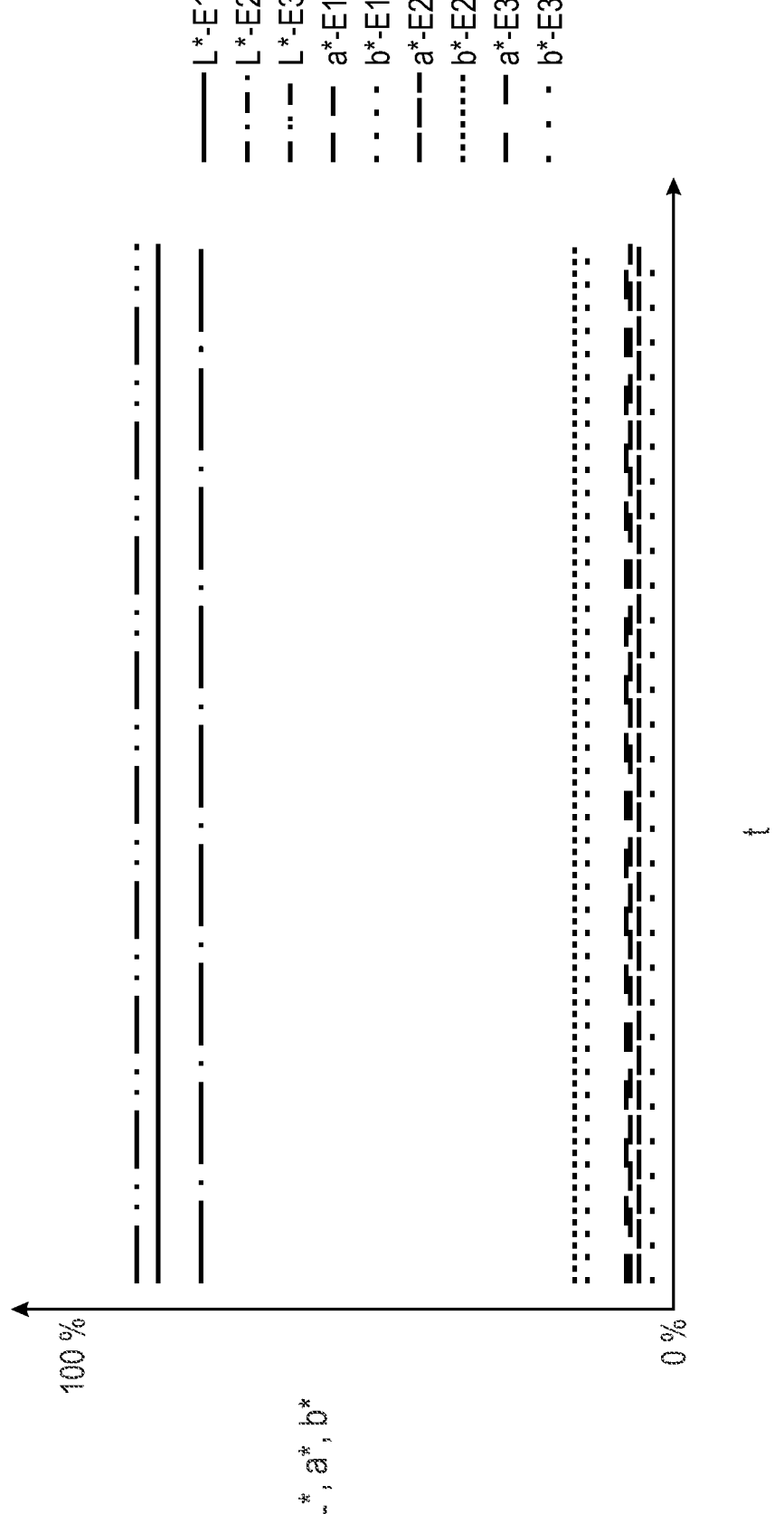
FIG. 2 shows a progression against time of illustrative colour coordinates ascertained by means of the at least one optical measurement for different formulations of the electrode suspension, which have been determined by means of the at least one optical measurement.

The effect of the formulation on the colour coordinates is shown by way of example in FIG. 2. In FIG. 2, the colour coordinates L*, a*, b* for different formulations E1, E2, E3 of the electrode suspension are plotted against time t. For better clarity, the colour coordinates L*, a*, b* are each plotted in normalized form on the y axis. It is apparent from FIG. 2 that the colour coordinates of different formulations E1, E2, E3 are different. The different formulations E1, E2, E3 are mutually distinguishable by means of the at least one optical measurement.

In the example shown in FIG. 2, the colour coordinates L*, a*, b* for the individual formulations E1, E2, E3 do not change over time t. This shows a stable production process without process fluctuations.

Changes in the measurement data M, especially in the colour coordinates, indicate changes in formulation, changes in process and/or unstable processes. For example, the changes in the colour coordinates, especially the changes thereof, can be used to distinguish between different process steps or process intervals. For example, it is possible to distinguish between a start of a process, a stable process and an end of a process. The stable process is shown by way of example in FIG. 2.

Figure 3:
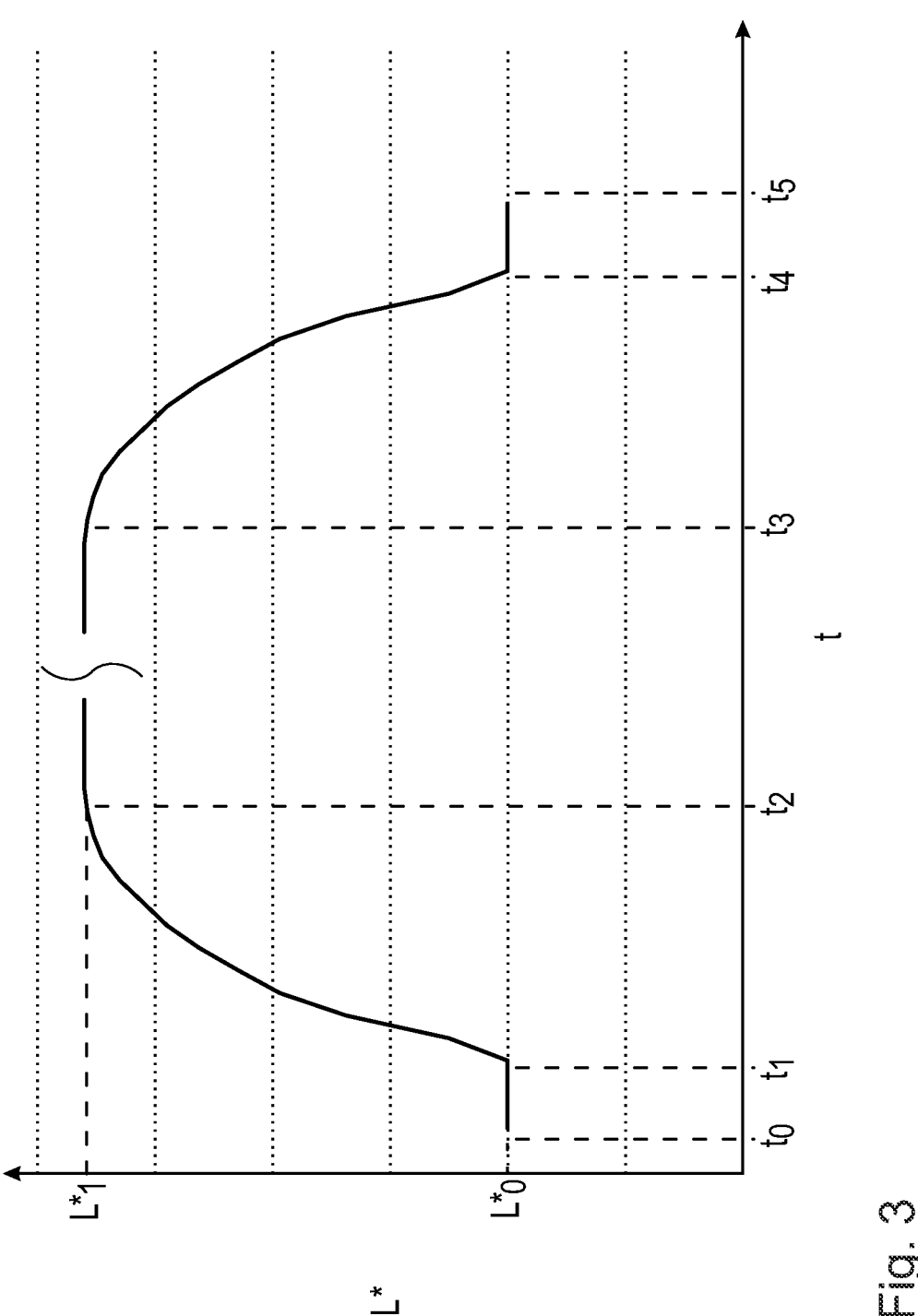
FIG. 3 shows a progression against time of an illustrative colour coordinate of the electrode suspension, ascertained by means of the at least one optical measurement, during a startup of the process and an end of the process.

FIG. 3 shows the colour coordinate L* against time t for the start of the process, called the startup, and the end of the process. At time to, the arrangement 1, especially the extruder 2, is switched on. At ti, the metering devices are switched on and hence the formulation constituents A, B, C, D are metered in. With a certain time delay, a change in the colour coordinate L* over time t sets in. The colour coordinate L* changes from a starting value $L*_0$ and approaches a target value $L*_1$ corresponding to the desired formulation. At time $t_2$, the target value $L*_1$ is attained. The subsequent plateau indicates that the process is running stably and hence the process startup is complete.

At $t_3$, the metering devices 6 are switched off. This initiates the end of the process. The colour coordinate L* changes from the target value $L*_1$ until the extruder 2 is emptied at $t_4$. At time $t_5$, the machine is shut down.

Figure 4:
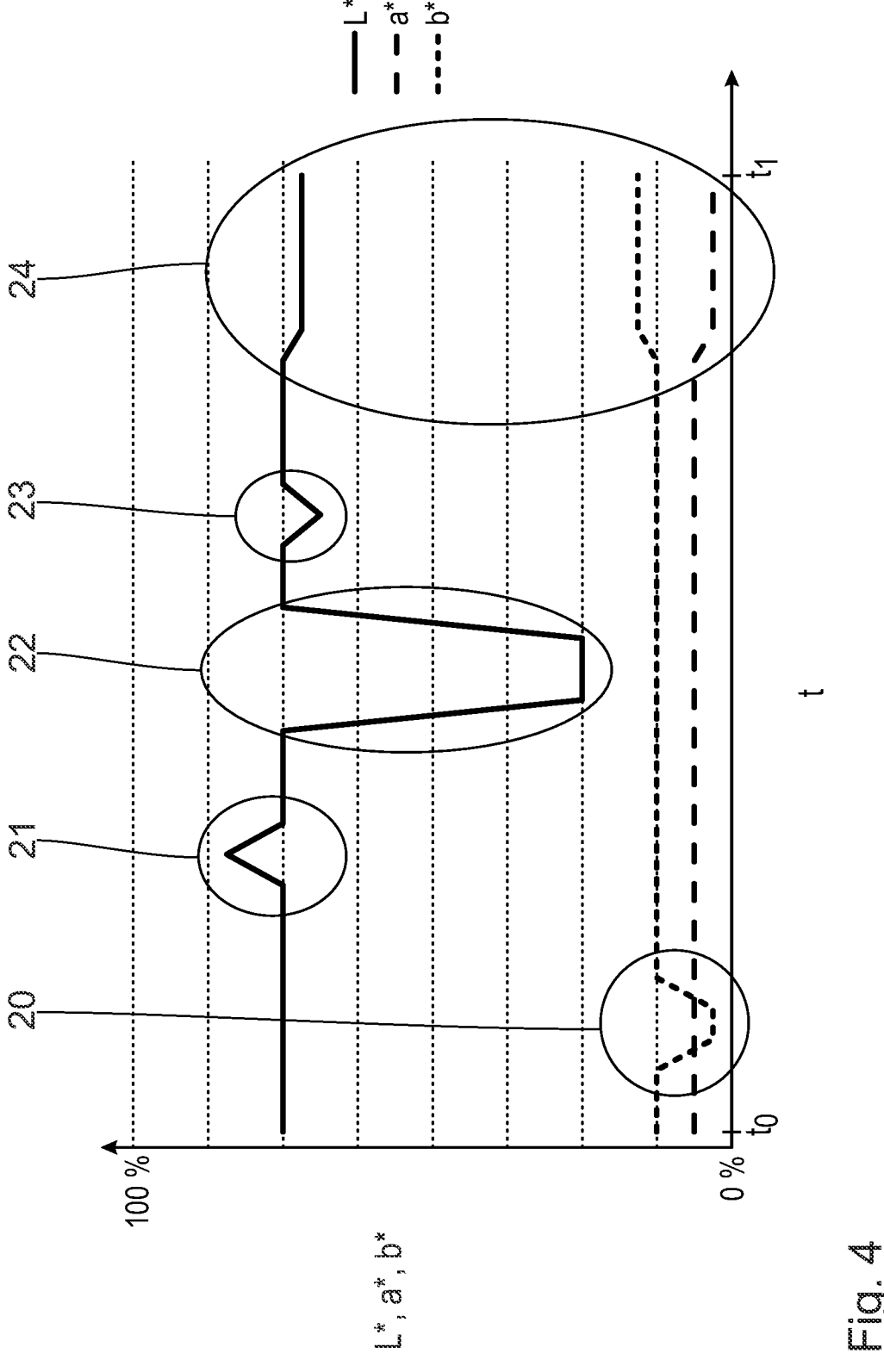
FIG. 4 shows a progression against time of illustrative colour coordinates ascertained by means of the at least one optical measurement during the production process.

In FIG. 4, the colour coordinates L*, a*, b*, each in normalized form, are plotted against time t. FIG. 4 shows various possible process changes or process fluctuations in the production process and the effects thereof on the colour coordinates. It is apparent from FIG. 4 how changes in the measurement data can be used to draw conclusions as to individual process changes and/or corresponding production faults.

At time to in FIG. 4, a stable process is running, in which the target values for the colour coordinates L*, a*, b* are observed.

At 20, there is a temporary reduction in the colour coordinates b*. The blue shift indicated thereby occurs because of a reduced binder content. The significant drop in the colour coordinates b* can be explained by a temporary failure of the corresponding metering device 6. After the failure has been remedied and/or the binder content has been increased, the colour coordinate b* increases again to the target colour coordinate.

At 21, a temporary increase in the colour coordinate L* is shown. The increase in the colour coordinate L* is attributable to a change in the throughput. For example, the temporary increase in the colour coordinate L* is attributable to an increase in all metered additions, in particular one that is independent of the addition points thereof. This results temporarily in formulation variances.

At 22, a temporary slump in the colour coordinate L* is shown. The decrease in the colour coordinate L* is attributable to an increase in the concentration of the conductive particles, especially soot and/or graphite platelets, for example to an overdose of this formulation constituent.

At 23, a slight decrease in the colour coordinate L* is shown. This is attributable to a temporary change in the speed, especially an increase in the speed.

At 24, a slight change in all colour coordinates can be seen. This indicates a change of formulation, for example because different formulation constituents are being used and/or the mixing ratio thereof is altered. After a short transition phase, a constant value is established for the respective colour coordinates, which indicates a successful change of formulation.

Figure 5:
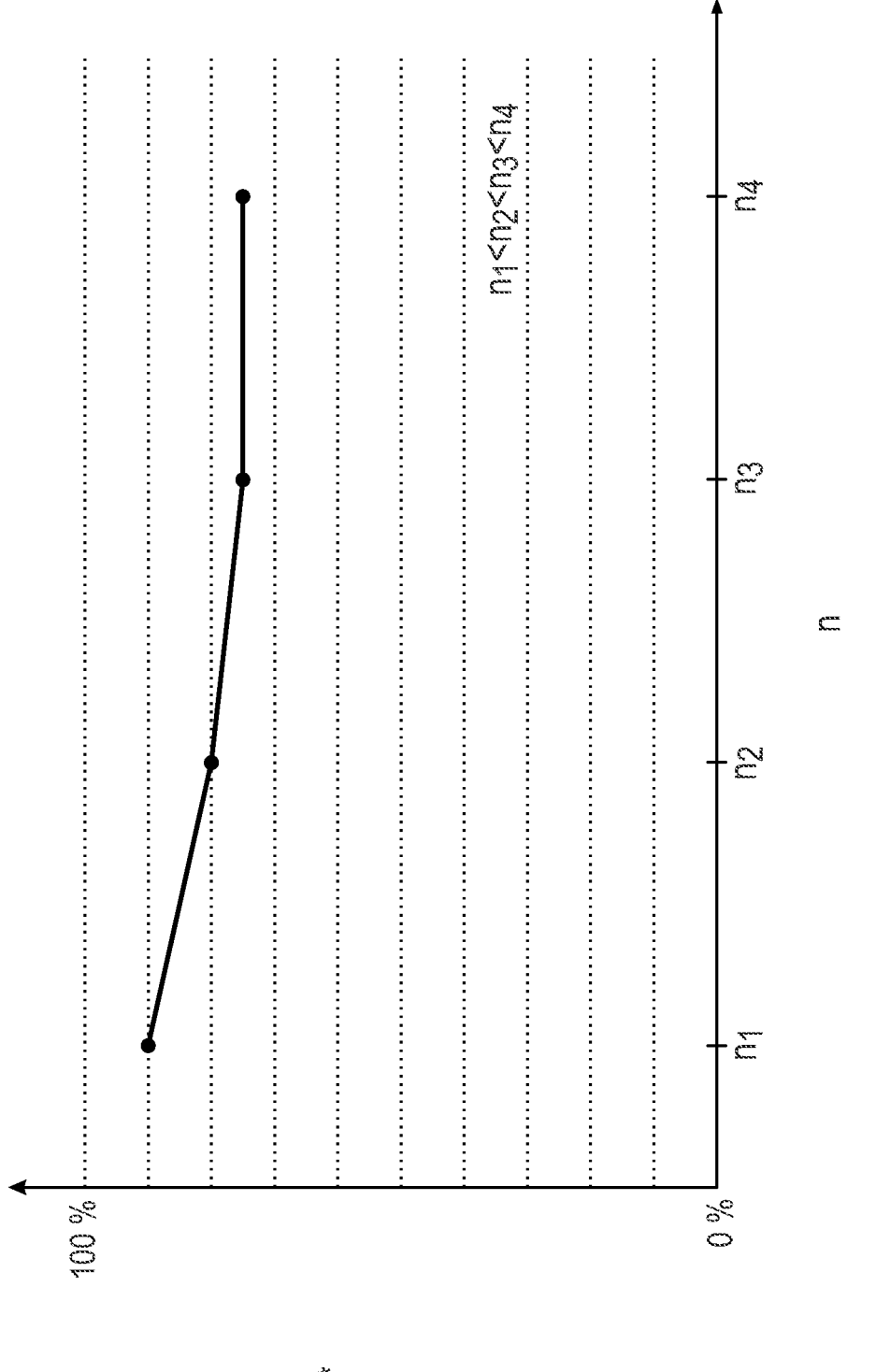
FIG. 5 shows a plot of an illustrative colour coordinate ascertained by means of the at least one optical measurement for different extruder speeds.

In FIG. 5, the colour coordinate L* in normalized form is plotted as a function of extruder speed n. With higher extruder speed n, there is a decrease in the value of the colour coordinate L*. With the aid of this knowledge, it is possible to precisely attribute changes in the colour coordinate L* as shown, for example, at 23 in FIG. 4 to specific changes in the process parameters, here to the extruder speed n.

Figure 6:
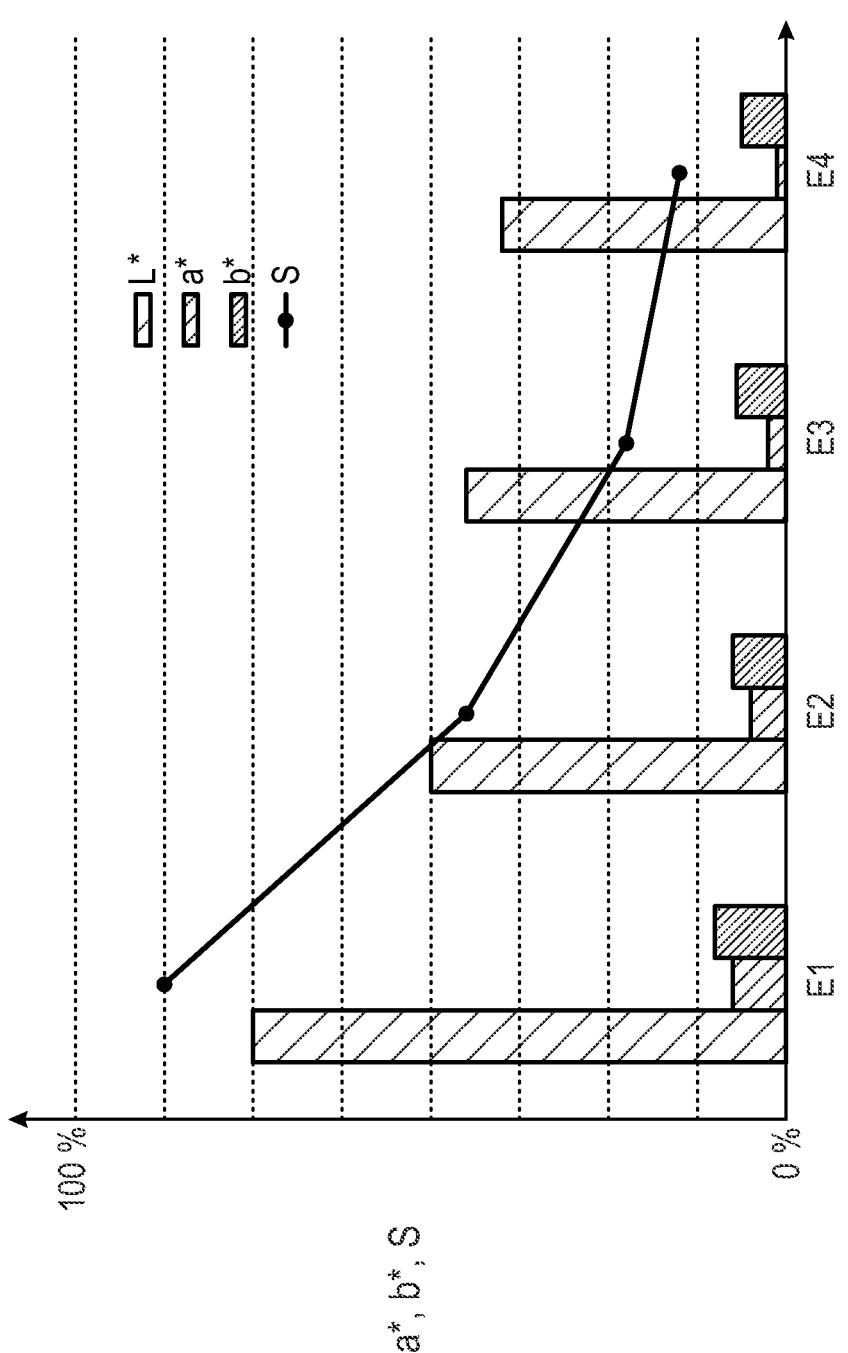
FIG. 6 shows a plot of an illustrative colour coordinate ascertained by means of the at least one optical measurement for different particle sizes.

FIG. 6 shows the influence of the average particle size S of the conductive particles on the colour coordinates L*, a*, b*, where the average particle size S and the colour coordinates L*, a*, b* are each plotted in normalized form on the y axis. The colour coordinates L*, a*, b* are shown for various formulations E1 to E4, with differences in the formulations E1 to E4 only with regard to the average particle size S of the fillers. The term "filler" refers to the formulation constituents fed in in solid form. With decreasing average particle size S, there is a change in the colour coordinates, especially the colour coordinate L*. This shows that the at least one colour coordinate L*, a*, b* correlates with the average particle size S. Thus, a change in the average particle size S is also ascertainable from the evaluation of the at least one colour coordinate L*, a*, b*.

It is apparent from the above description that the evaluation of the measurement data, especially of the at least one colour coordinate, enables reliable verification of the properties of the electrode suspension. In particular, conclusions are possible as to individual formulation constituents, the mixing ratio thereof and/or process parameters. More preferably, the evaluation is possible with reference to the measurement data, especially the colour coordinates, in conjunction with the monitoring of further process parameters. In this way, it is possible to distinguish unambiguously between different causes for changes in the properties of the electrode suspension.

The examples described above for evaluation were elucidated by way of example using the colour coordinates of the CIELAB colour space. Corresponding correlations can be ascertained for other colour spaces too. For this purpose, for example, the electrode suspension can be analysed while process parameters are varied. The data obtained can then be used to ascertain corresponding relationships and these relationships can be used to evaluate future measurements.

The formulation of the electrode suspension can be verified and monitored on the basis of the evaluation of the measurement data. In particular, it is possible to recognize variances in the formulation from a target quality. In this way, it is possible to distinguish between different quality levels of the electrode suspension in a simple manner. In particular, it is possible to discharge an electrode suspension that does not have a certain target quality.

With the aid of the optical measurement and the evaluation thereof, it is possible to assign changes in the electrode suspension to process fluctuations. On the basis of these findings, it is possible to ascertain and initiate suitable countermeasures, for example changes in the process parameters and/or metered additions. This can be done manually by an operator. Additionally or alternatively, automatic closed-loop control is possible, as described, for example, in FIG. 1 with reference to the closed-loop control unit 18.

There follows a description of a possible procedure in the case of a closed-loop control system, especially an automatic closed-loop control system. If a variance in the electrode suspension from a target property is detected, it is especially possible to take one or more of the following measures:

A check is made as to whether control units of the arrangement, especially the extruder controllers and/or peripheral device controllers, are indicating a fault. In the event of a fault, this should be no closed-loop control of the process parameters before the fault is remedied. For example, the faulty component can be displayed to a machine operator, and so the machine operator will try to remedy the fault. The check is preferably made before further closed-loop control steps are implemented.

If a variance that can be assigned to a single metered addition, especially a single metering device 6, is detected, this can be corrected by closed-loop control. The closed-loop control correction can especially be effected within limits defined above.

If a variance in a formulation constituent which is added over several metered additions in the process is recognized, it is also possible to vary the division ratio of the added amounts between the individual metered additions, especially the individual metering devices. In this way, a closed-loop control correction of the respective metered addition is possible without varying the total amount added.

If a variance that cannot be assigned to any metered addition is detected, the speed can be corrected by closed-loop control. For example, an increase in the speed can result in introduction of more mechanical energy into the process, by means of which the homogeneity of the suspension is adjustable. A higher extruder speed can especially improve the quality and/or homogeneity of the suspension. However, a rising extruder speed also has the disadvantage of an elevated energy input into the electrode suspension, and therefore the aim in closed-loop control is a balance between energy input and suspension quality, especially homogeneity.

If it is not possible to assign the variance to any metered addition, it is additionally or alternatively also possible to vary the total throughput. Changing the total throughput changes the introduction of mechanical energy into the suspension. In this way, it is possible to influence the quality, especially the homogeneity, of the suspension.

If the detected variance cannot be assigned to any metered addition, the ratio between solvent and filler content may be varied, especially varied within predefined limits If the detected variance cannot be assigned to any metered addition, it is also possible to vary the process temperature, for example a housing temperature and/or suspension temperature. The adjustment in temperature can especially counteract significantly fluctuating production conditions as can occur, for example, in the event of failure of the ventilation and/or heating system and/or the storage of raw materials under undefined climatic conditions. A change in the process temperature alters the thermal energy input and/or, on account of a change in the suspension viscosity, at least indirectly alters the mechanical energy input.

In the case of closed-loop control correction of one or more process parameters, it should preferably be ensured that a suspension temperature and/or a suspension pressure at the extruder outlet remains within a defined tolerance range. If required, it is possible to take suitable closed-loop control measures in order to correspondingly assure the suspension properties. For example, in the event of a change in the total throughput, it is simultaneously possible to adjust the extruder speed and/or a housing temperature. For example, it is thus possible to ensure that the speed-to-throughput ratio remains within a predefined tolerance range.

If individual closed-loop control steps among those mentioned above are insufficient to bring the electrode suspension on-spec again, it is possible to conduct various closed-loop control steps individually and/or in combination. In the case of further closed-loop control steps, prior closed-loop control measures can be at least temporarily reversed.

If the variance detected cannot be remedied by one or more of the above closed-loop control measures, it is also possible, for example, for the operator to manually inspect the plant component. In this way, it is possible to find sources of error undetectable via the device controllers, for example blocked atmospheric degassing lines, worn-out housings and/or screw elements and/or leaks.

Figure 7:
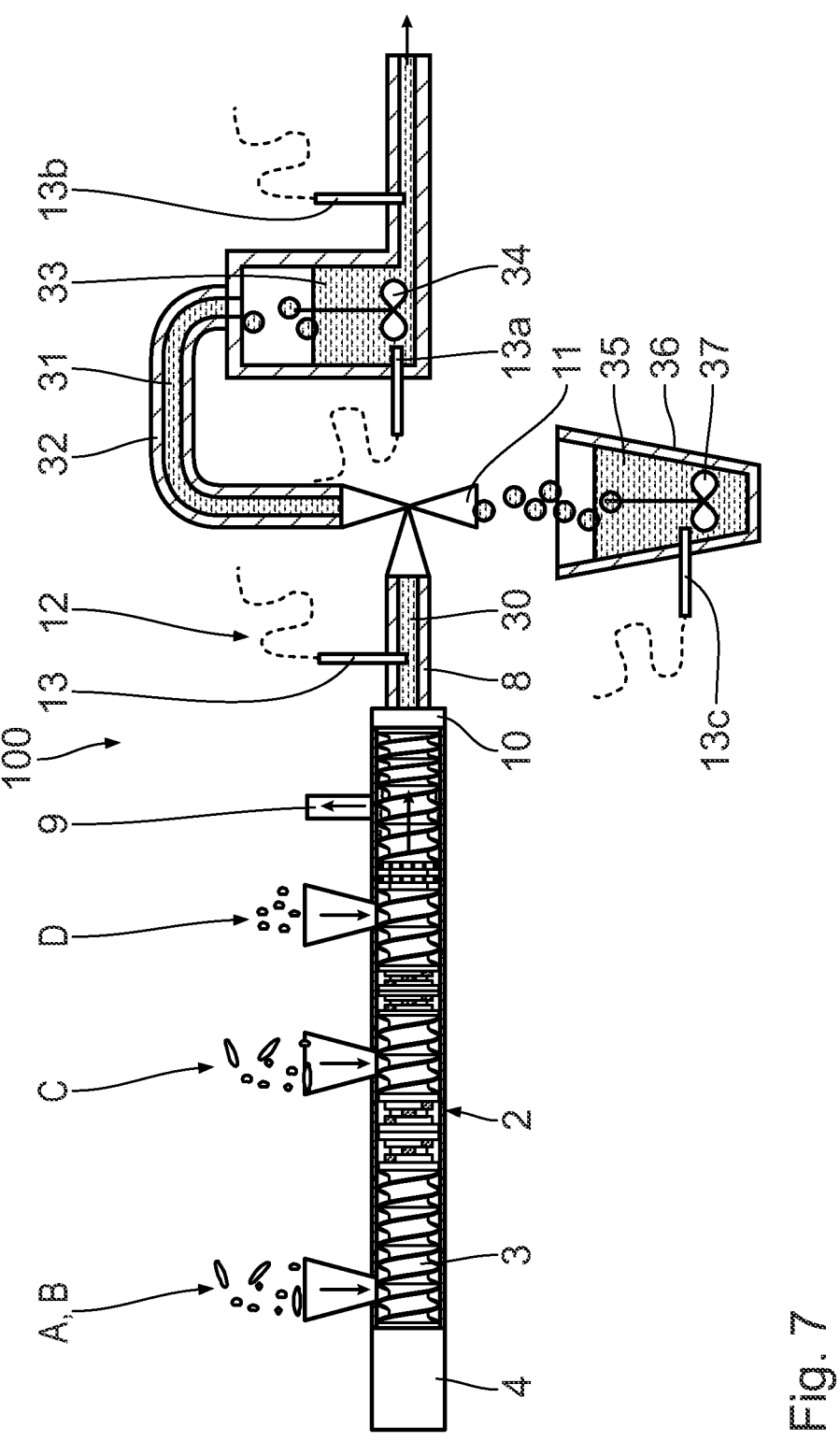
FIG. 7 shows a schematic diagram of a further working example of an arrangement for production of an electrode suspension.

FIG. 7 shows a schematic of a further working example of an arrangement 100 for production of an electrode suspension. Components that have already been described in relation to the working example in FIG. 1 bear the same reference numerals and are not elucidated in detail again.

The arrangement 100 in FIG. 7 corresponds to the arrangement 1 shown in FIG. 1 with regard to the configuration of the extruder 2 and the controller thereof. For better clarity, open-loop control devices, closed-loop control devices, signal lines etc. are not shown again.

A possible further treatment of the electrode suspension 30 is further elucidated using the working example shown in FIG. 7. The electrode suspension 30 is conveyed through the extruder outlet 8 of the extruder 2 and analysed with the aid of the measurement device 12, of which only the sensor 13 is shown. The actuation of the multiway valve 11 depends on the analysis of the corresponding measurement data. If the electrode suspension 30 meets a target quality, it is sent to further processing via the multi-way valve 11 as on-spec suspension 31 via a pipe conduit 32. In the working example shown, the on-spec suspension 31 is first stored intermediately in a buffer silo 33. In the buffer silo 33, the on-spec suspension is kept in motion with the aid of a stirrer system 34 in order to minimize, especially to avoid, separation effects.

If the quality of the electrode suspension 30 is below the target quality, it is directed as off-spec suspension 35 into a collecting vessel 36 with the aid of the multiway valve 11. The off-spec electrode suspension 35 is discharged from the process. The off-spec electrode suspension 35 can be processed in the collecting vessel 36, for example by metered addition of any missing formulation constituents. In order to avoid separation effects and/or in order to further homogenize the off-spec electrode suspension 35, it is stirred with the aid of a stirrer system 37. Should processing of the off-spec electrode suspension 35 not be possible, it can be discharged as reject material and/or recycled into the process as starting material.

The arrangement 100 has multiple measurement devices 12, of which only the sensors 13, 13a, 13b, 13c each are shown. This enables optical measurement of the electrode suspension at different points. This especially makes it possible to monitor changes in the electrode suspensions along the conveying pathway of the suspension stream.

The sensors 13a, 13b, for analysis of the inline electrode suspension 31, are arranged along the connection between the multiway valve 11 and further processing stations (not shown in the figures). The sensor 13a is disposed in the region of the buffer silo 33. The sensor 13a conducts an optical measurement on the on-spec electrode suspension 31 in the buffer silo 33. This enables in particular early recognition of separation processes in the on-spec electrode suspension 31.

The sensor 13b is disposed in a pipe connection between the buffer silo 33 and further processing stations. The sensor 13b analyses the on-spec electrode suspension 31 conducted onward to the further processing stations. This ensures that the electrode suspension fed to the further processing operation does indeed have the respective target properties, especially the target quality.

The sensor 13c is assigned to the collecting vessel 36. With the aid of the sensor 13c, it is especially possible to monitor a processing operation of the off-spec electrode suspension 35. In particular, it is possible to determine whether it is possible to achieve a target property, especially a target quality, of the electrode suspension with the aid of the processing operation.

Figure 8:
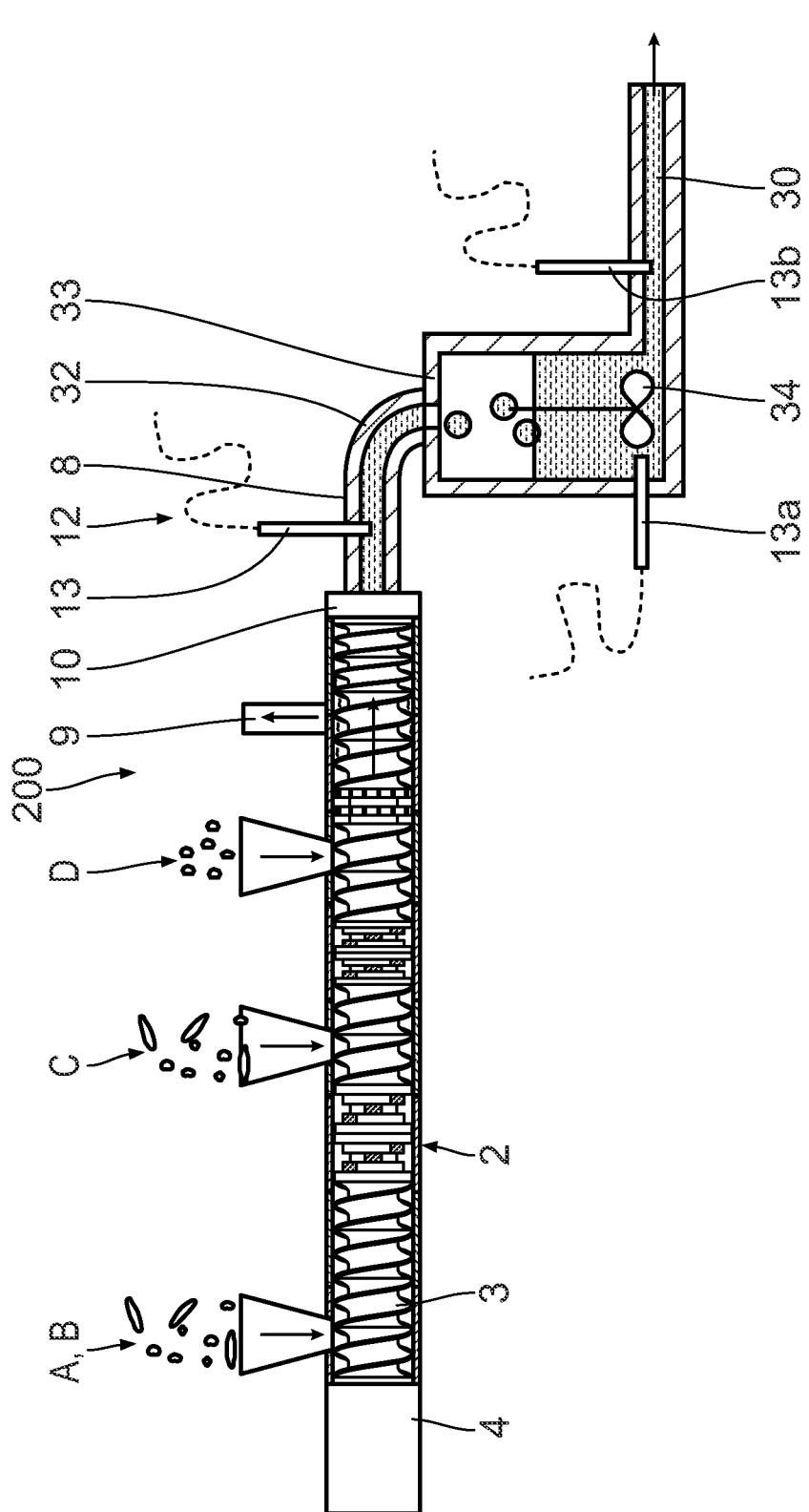
FIG. 8 shows a schematic diagram of a further working example of an arrangement for production of an electrode suspension.

FIG. 8 shows a further working example of an arrangement 200 for production of an electrode suspension 30. Components that have already been described in relation to the preceding working examples bear the same reference numerals and will not be elucidated specifically again.

The arrangement 200 differs from the arrangement 100 described in FIG. 7 merely in that there is no multiway valve connected to the extruder outlet 8. The extruder outlet 8 is connected directly to the pipeline 32 via which the electrode suspension 30 is introduced into the buffer silo 33. There is no automatic discharge of the electrode suspension in the arrangement 200.

Figure 9:
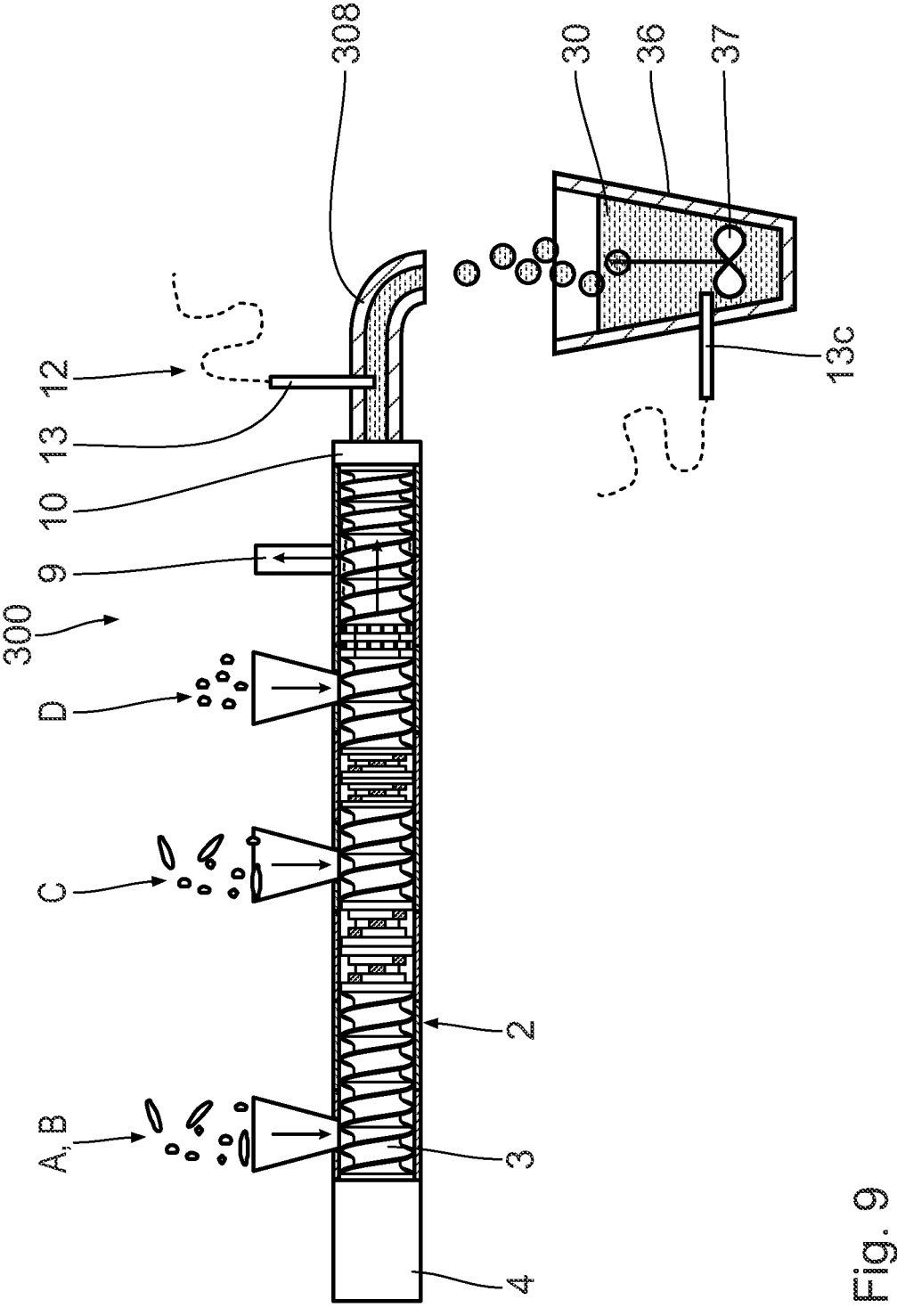
FIG. 9 shows a schematic diagram of a further working example of an arrangement for production of an electrode suspension.

FIG. 9 shows a further working example of an arrangement 300 for production of an electrode suspension 30. Components corresponding to those in the preceding working examples bear the same reference numerals and will not be elucidated in detail again.

The arrangement 300 has an open extruder outlet 308 via which the electrode suspension is introduced directly into the collecting vessel 36. The electrode suspension 30 introduced into the collecting vessel 36 can then be processed further depending on an evaluation of the measurement data from the measurement devices, of which only the sensors 13 and 13c are shown in each case. The arrangement 300 therefore shows a quasi-continuous production process in which the electrode suspension 30 is extruded continuously, but then processed further batchwise.

Figures 10, 11, 12:
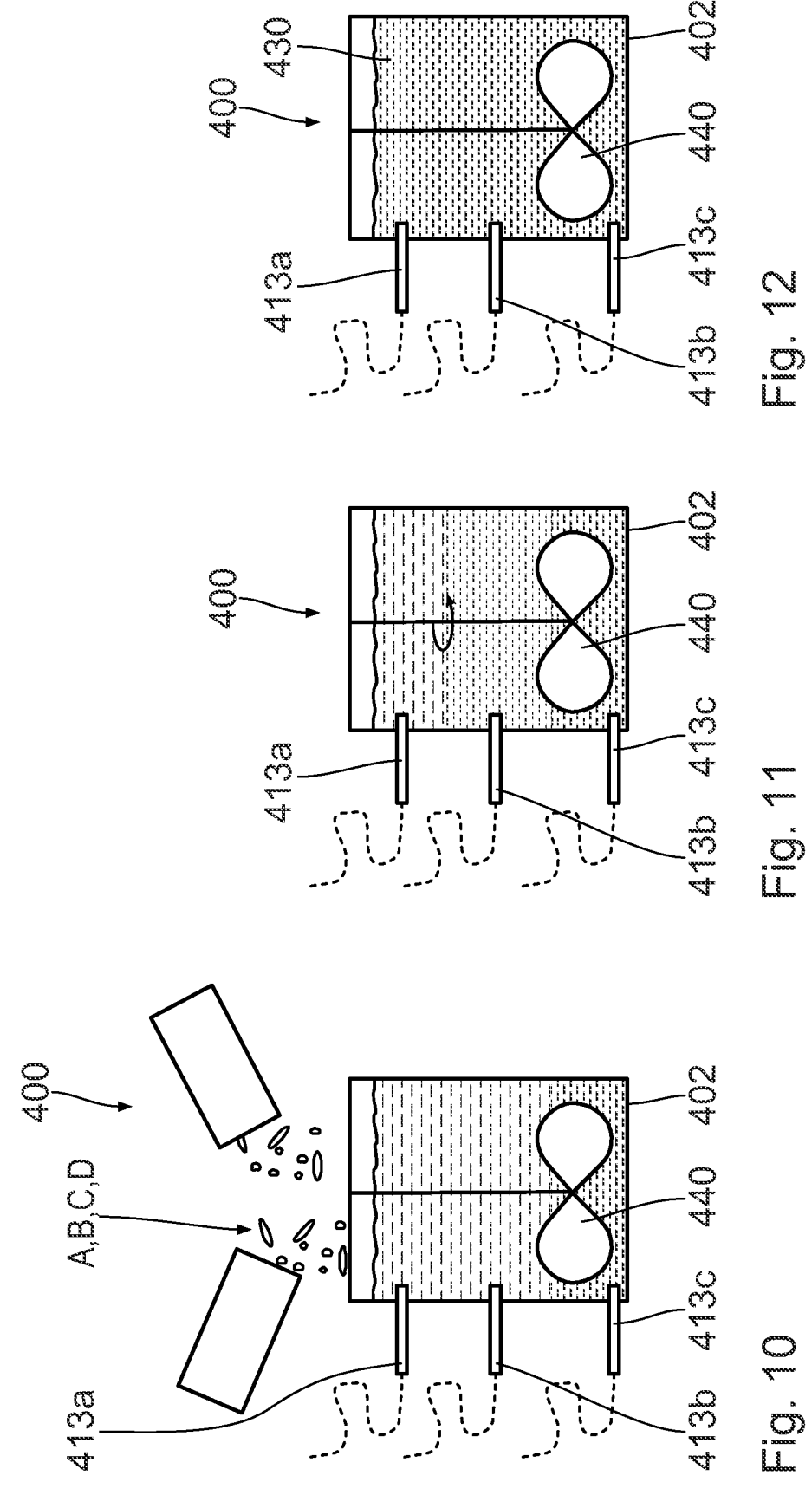
FIG. 10 shows a schematic diagram of a further working example of an arrangement for production of an electrode suspension in the batchwise method during the addition of the formulation constituents.
FIG. 11 shows the arrangement according to FIG. 9 during the mixing of the formulation constituents.
FIG. 12 shows the arrangement according to FIG. 9 after sufficient mixing of the formulation constituents to give the electrode suspension.

With reference to FIGS. 10 to 12, a further working example of an arrangement 400 for production of an electrode suspension 430 is shown.

The arrangement 400 serves for batchwise production of the electrode suspension 430. The arrangement 400 has a mixing apparatus 402 in the form of a batch mixer. The batch mixer 402 has a stirrer system 440. The arrangement 400 has multiple measurement devices, of which the sensors 413a, 413b, 413c are shown in each case. Also not shown for the sake of simplicity is an evaluation unit for evaluation of the measurement data detected with the aid of the measurement devices.

The sensors 413a, 413b, 413c are mounted at different positions in the batch mixer 402, such that these project into the mixing volume of the batch mixer. As a result, the suspension can be analysed at different positions, especially at different heights, within the mixing volume of the batch mixer 402.

With the aid of the sensors 413a, 413b, 413c, mixing of the formulation constituents is monitored. FIGS. 10 to 12 show different junctures in the mixing operation. The formulation constituents A, B, C, D of the electrode suspension are introduced into the batch mixer 402. The introducing of the formulation constituents A, B, C, D is shown schematically only at the start of the process in FIG. 10. It is additionally or alternatively also possible to introduce formulation constituents A, B, C, D at a later juncture, for example during the mixing operation, which is shown schematically in FIG. 11. In particular, the formulation constituents A, B, C, D can be introduced successively.

If the formulation constituents are insufficiently mixed, as shown in FIG. 10 in particular, the measurement devices with the sensors 413a, 413b, 413c disposed at different positions detect different measurement data, especially different colour coordinates.

FIG. 11 shows the mixing operation during the rotary driving of the stirrer system 440. In this case, the formulation constituents are mixed successively to give a homogeneous electrode suspension. It is possible to introduce further formulation constituents A, B, C, D during the mixing operation. Continuous measurement with the aid of the sensors 413a, 413b, 413c of the measurement devices makes it possible to monitor the changes that occur here in the measurement data, especially the colour coordinates. By means of a comparison of the measurement data from the different sensors 413a, 413b, 413c, it is possible to conclude the dispersion quality, especially the homogeneity, of the electrode suspension. For as long as changes in the measurement data, especially in the colour coordinates, and/or differences between the measurement data from the respective sensors 413a, 413b, 413c are detected, the mixing operation is incomplete. In addition, different colour values can be considered for each change in formulation and/or change in process.

On attainment of static measurement data and/or corresponding measurement data from the sensors 413a, 413b, 413c, a homogeneous electrode suspension 430 is present, as shown in FIG. 12. The evaluation of the corresponding measurement data can therefore be used to determine the end of the mixing operation. In addition, it is possible via the evaluation of the measurement data, especially the colour coordinates, to verify a target quality of the electrode suspension, especially with regard to the formulation constituents and/or the mixing ratio thereof.

Depending on an evaluation of the measurement data, actuation of the stirrer system 440 is also possible. For example, it is possible to adjust a speed of the stirrer system 440. In particular, it is possible to control a duration of the actuation of the stirrer system 440, in order to ensure that a homogeneous, high-quality electrode suspension 430 is produced.

What is claimed is:

1. A process for producing an electrode suspension, comprising the steps of:
   providing formulation constituents of the electrode suspension,
   mixing the formulation constituents to give the electrode suspension,
   conducting at least one optical measurement on the electrode suspension, in each case by detecting a spectrum of the electrode suspension over at least one subregion of the at least one of ultraviolet, visible and infrared frequency range,
   evaluating the at least one optical measurement and
   further treating the electrode suspension depending on the evaluation.

2. The process according to claim 1, wherein the evaluation is effected using at least one colour coordinate of a colour space that has been ascertained from the spectrum.

3. The process according to claim 2, wherein at least one colour variance of the at least one colour coordinate from a corresponding target colour coordinate is ascertained and further treatment of the electrode suspension is effected depending on the at least one colour variance.

4. The process according to claim 1, wherein the electrode suspension is produced continuously.

5. The process according to claim 1, wherein the electrode suspension is produced by means of an extruder.

6. The process according to claim 1, wherein, depending on the evaluation, a multi-way switch for deflection of the suspension stream is actuated.

7. The process according to claim 1, wherein the at least one optical measurement is effected inline.

8. The process according to claim 1, wherein multiple optical measurements are conducted at different positions.

9. The process according to claim 1, wherein multiple optical measurements are conducted successively.

10. The process according to claim 1, wherein, depending on the evaluation at least one of the providing of the formulation constituents and the mixing of the formulation constituents are controlled by closed-loop control.

11. The process according to claim 1, wherein a result of the evaluation is stored.

12. An arrangement for production of an electrode suspension, comprising:
   mixing device for mixing two or more formulation components to give the electrode suspension,
   at least one measurement device for conducting at least one optical measurement on the electrode suspension, where the at least one measurement device is designed to detect a continuous spectrum of the electrode suspension over at least one subregion of the at least one of ultraviolet, visible and infrared frequency range,
   an evaluation unit for evaluation of the at least one optical measurement, and a control unit for at least one of open-loop and closed-loop control of the mixing device and further treatment of the electrode suspension depending on the evaluation of the at least one optical measurement.

13. The arrangement according to claim 12, wherein the mixing device has an extruder.

14. The arrangement according to claim 12, comprising a multiway switch for deflection of the suspension stream depending on the evaluation of the at least one optical measurement.

15. The arrangement according to claim 12, wherein the at least one measurement device is set up to analyse the electrode suspension at least one of in the mixing device and at an outlet from the mixing device.

16. The arrangement according to claim 12, comprising multiple measurement devices disposed at different positions.

17. The arrangement according to claim 12, wherein the at least one measurement device includes a spectrophotometer.

* * * * *